Figure 1:
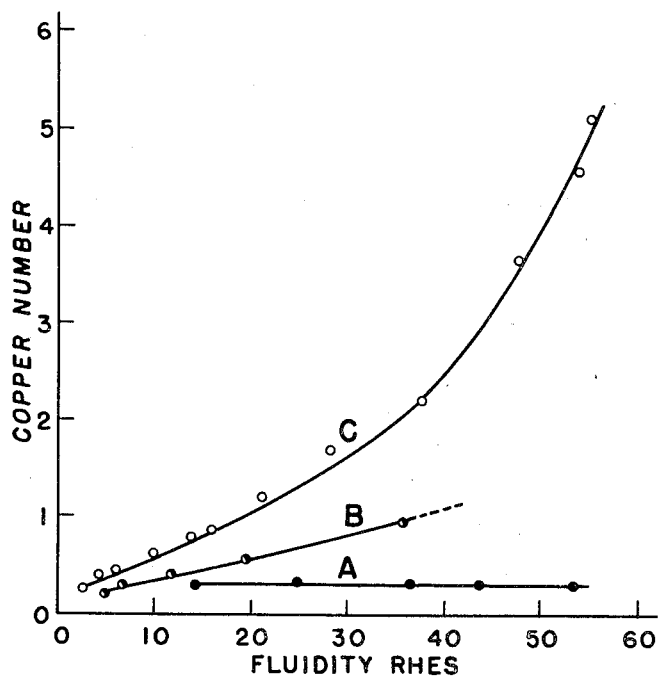

Sept. 5, 1950 R. E. REEVES 2,520,963
PRODUCTION OF IMPROVED CELLULOSIC MATERIALS
Filed June 6, 1947

INVENTOR.
R. E. REEVES

Patented Sept. 5, 1950

2,520,963

UNITED STATES PATENT OFFICE 2,520,963

PRODUCTION OF IMPROVED CELLULOSIC MATERIALS

Richard E. Reeves, New Orleans, La., assignor to the United States of America as represented by the Secretary of Agriculture Application June 6, 1947, Serial No. 753,121

6 Claims. (Cl. 260—212)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the production of cellulosic materials having improved resistance against attack by chemical reagents, especially alkalies.

According to this invention, when cellulosic materials are treated with an anhydrous alcohol containing an anhydrous acid, or acid with very limited amounts of water as catalyst, there occurs a cleavage of certain linkages in the cellulose molecule to form modified cellulose containing alcohol bound in chemical union. This reaction is hereafter called "alcoholysis," or specifically, methanolysis or ethanolysis, where the alcohols employed are methanol or ethanol, respectively. The products of alcoholysis of cellulose differ from modified celluloses of equal molecular size prepared in other manners, by possessing remarkable resistance against reaction with dilute aqueous alkalies, either hot or cold.

Cellulose in an essentially dry state (such as air-dried or oven-dried) reacts at ordinary temperatures or at elevated temperatures with remarkable rapidity with a solution prepared by dissolving an anhydrous acid such as hydrogen chloride in an anhydrous alcohol such as commercial anhydrous methanol. The resulting product is essentially free from combined acid, but contains traces of very firmly bound alcohol which may be liberated by drastic aqueous acid hydrolysis, or may be determined as alkoxyl groups in the usual manner. The product, in the cases of methanol or ethanol, is a colorless white powder exhibiting many of the usual cellulose reactions such as xanthation, nitration, and acetylation to give products analogous to those produced from cellulose, except that such products are usually of lesser molecular size than similar ones obtained from unmodified cellulose. Alcoholyzed cellulose is soluble in cellulose solvents such as cuprammonium hydroxide solution, cupraethylenediamine solution, or certain quaternary ammonium hydroxide solutions. (The optical behavior of the cuprammonium solution is indistinguishable from that of cellulose itself.) However it differs from cellulose modified by other reagents such as aqueous acids or oxidizing agents, by having essentially no reducing action toward alkaline copper solutions and low reactivity toward, or low solubility in, dilute alkalies of all sorts.

If the alcoholysis reaction be carried out similarly, but in the presence of as little as 10 percent water, then the reaction is appreciably slower and takes a different course. The product differs from that obtained under essentially anhydrous conditions by having a measurably large reducing action toward alkaline reagents.

As stated above, in contrast with other methods of reducing the size of the cellulose molecule, alcoholysis does not produce an increase in the so-called "reducing value" of the modified cellulose. This behavior is illustrated in Table I and Figure 1, wherein reducing value is measured in terms of "copper number" by a known procedure of T. F. Heyes (J. Soc. Chem. Ind. 47T, 90 (1920). Included in this exhibit are cellulose preparations modified in one instance by methanolysis in absolute methanol (curve A); in a second case by reaction in methanol containing 10 percent by volume of water (curve B); and finally modification by aqueous acid (curve C), a well known procedure for producing so-called "hydrocellulose." The cuprammonium fluidities were measured by the method of the British Fabrics Research Committee (Fabrics Research Committee. The viscosity of cellulose solutions. H. M. Stationery Office, London, 1932) at 25° C. and employing a cellulose concentration of 0.5 percent. (All copper numbers reported herein were made by the aforementioned method of Heyes, and all cuprammonium fluidities were determined by the latter method using either 0.5 or 2.0 percent cellulose concentrations, the concentration being noted in each instance. In all fluidity measurements save on series, which is duly noted, the cuprammonium solvent contained 15 grams of copper and 240 grams of ammonia per liter, and the temperature of measurement was 25° C. All fluidities are expressed in terms of rhes—reciprocal poise.)

Table I

| 1 | 2 | 3 | 4 | 5 | 6 |
|---|---|---|---|---|---|
| (Anhydrous MeOH–HCl) | | (MeOH–H$_2$O (9:1)–HCl) | | (H$_2$O–HCl or H$_2$SO$_4$) | |
| Fluidity | Copper No. | Fluidity | Copper No. | Fluidity | Copper No. |
| 6.8 | 0.30 | 4.4 | 0.16 | 3.9 | 0.36 |
| 13.6 | .24 | 5.9 | .24 | 5.6 | .37 |
| 24.4 | .33 | 11.2 | .35 | 9.7 | .56 |
| 37.0 | .30 | 19.3 | .50 | 13.7 | .75 |
| 43.0 | .27 | 35.1 | .95 | 16.0 | .84 |
| 53.7 | .25 | | | 20.8 | 1.16 |
| 57.7 | .19 | | | 27.9 | 1.65 |
| | | | | 37.1 | 2.18 |
| | | | | 46.7 | 3.6 |
| | | | | 53.5 | 4.5 |
| | | | | 54.5 | 5.1 |

Inspection of Table I and Figure 1 shows that as the molecular size of the cellulosic material diminishes (as measured by increased cuprammonium fluidity) the reducing value (as measured by copper number) does not increase when the treating reagent is anhydrous acid-alcohol. When the treating reagent is aqueous acid there is a marked increase in reducing value with increase in fluidity. (This increase is even more pronounced if any of the oxidizing reagents such as sodium hypochlorite, periodic acid, dichromate, and so forth, be employed to increase the fluidity.) An intermediate, but nevertheless pronounced increase in reducing value is observed if the cellulosic material be treated with catalyst and methanol containing 10 percent water. The copper number of the untreated cellulosic material was found to be approximately 0.30. Columns 1 and 2 give the fluidity and copper number for different methanolyzed cellulose preparations which were prepared using anhydrous methanol-HCl reagent. Columns 3 and 4 give the corresponding values when the reagent was methanol containing 10 percent by volume of water and HCl as catalyst. Columns 5 and 6 list various "hydrocelluloses" (fluidities and copper numbers, respectively) prepared by treating cellulose with water containing HCl or $H_2SO_4$. All fluidity determinations reported in Table I were made using 0.5 percent cellulose concentrations.

When the alcoholyzed cellulose is compared with hydrocellulose of approximately equal cuprammonium fluidity, as was done in the preceding table and figure, the striking difference in the relationship between fluidity and copper number becomes apparent. The extremely low copper number of the highly degraded alcoholyzed material indicates almost complete absence of reducing groups. This is most simply explained by assuming that cleavage of the cellulosic chain involves hemi-acetal formation of the potential reducing group at the point of rupture illustrated by structure I in the accompanying diagram. A second possibility, which our experimental data does not exclude, is that the reducing groups are converted to acetals (structure II).

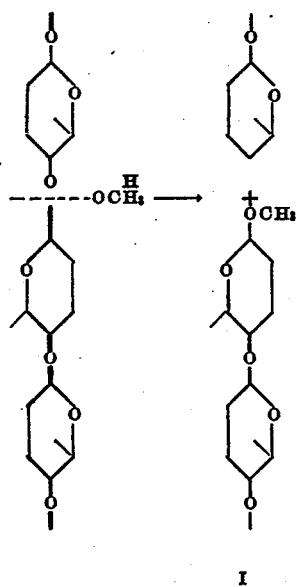

I or

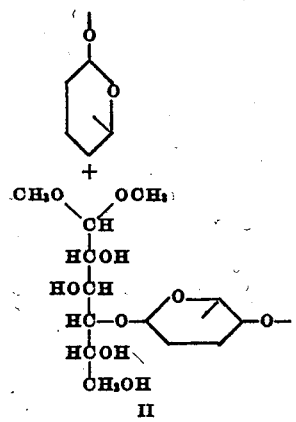

II

A second characteristic sharply distinguishing alcoholyzed cellulose from other modified celluloses is the low solubility of the alcoholyzed material in hot, dilute alkali. This is in sharp contrast with the behavior of highly degraded hydrocelluloses. A comparison of the solubility of the two types of celluloses is give in Table II. Since it is doubtful if true solubility could be influenced greatly by attachment of a single methoxyl group to a molecule composed of forty or more glucose units, it seems likely that the solubility of hydrocellulose is due to chemical reaction between the hot alkali and the reducing groups while the relative insolubility of the alcoholyzed material is due to the absence of reducing groups. Both the extensively hydrolyzed and alcoholyzed celluloses gelatinize in cold concentrated alkali under the conditions of alpha cellulose determination.

Aronovsky and Dryden (Aronovsky, S. I., and E. C. Dryden. The Paper Industry and Paper World. June. 1940) and Lynch, D. F. J. Ind. and Eng. Chem. 22, 952 (1930)) have shown that for many cellulosic materials solubility in the nitrators test (7.14% NaOH at 100° C.) is slightly higher than, but parallel to, solubility under the conditions of alpha cellulose determination. However, the alcoholyzed materials which disperse almost completely in 17.5 percent sodium hydroxide solution show only 4 to 7 percent solubility in the nitrators test.

Table II

| 1 | 2 | 3 | 4 |
|---|---|---|---|
| Hydrocellulose | | Alcoholyzed Cellulose | |
| Fluidity | Per cent dissolved | Fluidity | Per cent dissolved |
| 16.9 | 4.9 | 13.8 | 2.3 |
| 20.5 | 6.5 | 25.1 | 1.2 |
| 26.7 | 9.8 | 39.7 | 1.6 |
| 29.7 | 12.7 | 46.0 | 1.3 |
| 36.0 | 18.8 | 49.7 | 1.0 |
| 38.0 | 23.5 | 53.7 | 1.3 |
| 41.8 | 29.2 | 56.5 | 2.4 |
| 44.1 | 34.6 | | |
| 46.5 | 39.2 | | |
| 47.1 | 42.8 | | |
| 47.8 | 44.7 | | |

In Table II is shown, in columns 1 and 2, data on hydrocellulose from a typical experiment reported by Davidson (Davidson, G. F. J. Textile Inst. 34T, 87–96 (1943)). In column 1 are given cuprammonium fluidities, and in column 2 the percentages soluble in hot dilute aqueous alkali, for hydrocelluloses with 10 N $H_2SO_4$ at 20° C.

The fluidities reported in column 1 differ from all other fluidities in this application, in that they were determined in cuprammonium containing 15 grams of copper and 200 grams of ammonia per liter, and at a temperature of 20° C. We have determined in separate experiments, however, that fluidities determined under such conditions do not differ by more than a few percent from those obtained under the conditions we have employed, and the difference would in no wise be sufficient to render invalid the conclusion which may be drawn from Table II, namely, that alkali solubility is much less for alcoholyzed cellulose than it is for hydrocellulose of approximately the same fluidity. Column 3 gives the fluidity we have determined for different methanolyzed cellulose preparations, and column 4 gives the corresponding alkali solubility. Fluidities in columns 1 and 3 were determined at 0.5 percent cellulose concentration; and alkali solubilities in columns 2 and 4 were determined by keeping a weighed sample of the modified cellulose in approximately 100 parts of 1 percent aqueous sodium hydroxide solution for 6 hours in a boiling water bath, followed by filtering off the insoluble portion, and subsequent washing, drying, and weighing operations.

It has been shown (Davidson, G. F., J. Textile Inst. 34T, 87/96 (1943)) that when cellulose is hydrolyzed with aqueous acids the cuprammonium fluidity of the hydrocellulose increases to a maximum, and although continued treatment results in further loss of weight the fluidity of the undissolved residue remains practically constant. The situation suggests that the cellulose molecule when degraded below a certain limit either passes into solution or disappears because of increased susceptibility to further hydrolysis. Likewise with alcoholysis a limiting fluidity is approached and more drastic treatment results in loss of weight, but there is very little further increase in fluidity. A number of experiments which illustrate this phenomenon are given in Table III which compares alcoholysis and hydrolysis. It is remarkable that on alcoholysis or hydrolysis of native cellulose the same limiting fluidity is approached. Upon alcoholysis or hydrolysis of mercerized cellulose a higher fluidity may be obtained than is possible with "native" (not mercerized) cellulose. With the mercerized cellulose alcoholysis seems to give a slightly higher maximum fluidity than does hydrolysis.

*Table III*

| 1 | 2 | 3 | 4 | 5 | 6 |
|---|---|---|---|---|---|
| Hydrolysis | | | Alcoholysis | | |
| Treatment | Loss in weight | Fluidity (2%) | Treatment | Loss in weight | Fluidity (2%) |
| Native Cellulose | | | | | |
| 0.866 N HCl: | *Per cent* | | 0.28 N HCl in MeOH: | *Per cent* | |
| 2 hr., 100° | 4.0 | 21.7 | 1 hr., 80° | 1.7 | 22.0 |
| 2 hr., 120° | 10.4 | 23.8 | | | |
| 1.00 N HCl: | | | 1 hr., 100° | 3.4 | 24.2 |
| 3 hr., 120° | 13.0 | 24.2 | 1 hr., 120° | 5.0 | 24.4 |
| 4 hr., 120° | 31.0 | 24.8 | 0.55 N HCl in MeOH: | | |
| | | | 1 hr., 120° | 6.0 | 24.9 |
| | | | 4 hr., 120° | 7.3 | 25.6 |
| Mercerized Cellulose | | | | | |
| 0.866 N HCl: | | | 0.28 N HCl in MeOH: | | |
| 2 hr., 100° | 7.7 | 38.2 | 1 hr., 65° | | 33.9 |
| 2 hr., 120° | 16.9 | 37.7 | 1 hr., 80° | 1.7 | 39.7 |
| 1.00 N HCl, 3 hr., 120° | 24.5 | 36.3 | 1 hr., 100° | 3.3 | 41.7 |
| | | | 1 hr., 120° | 3.0 | 41.3 |
| | | | 0.55 N HCl in MeOH: | | |
| | | | 1 hr., 120° | 6.7 | 42.4 |
| | | | 4 hr., 120° | 6.7 | 42.2 |

Table III is divided into six columns the first three of which record the treatment, loss of weight upon treatment, and fluidity of the hydrocelluloses, respectively. These hydrocelluloses were prepared from cut cotton fiber which had been purified by a commercial firm. Some of the experiments were made on the native purified fiber, while some of the experiments were made subsequent to a so-called mercerizing treatment similar to the one described later under Example 5. Columns 4, 5, and 6 of Table III give the treatment, loss of weight on treatment and fluidity of alcoholyzed preparations, made from low viscosity linters purified by a commercial firm. Some of the acoholyzed experiments were likewise carried out on the linters following a mercerizing treatment. All fluidities reported in Table III were measured on 2.0 percent dispersions of cellulosic material. The experiments are arranged in Table III, for both native and mercerized celluloses, in the order of increasing intensity of treatments. The intensity being increased by means of higher temperature, greater acid concentration, or longer duration of treatment. It will be observed that the more drastic treatments result in the greatest loss of weight of material, but that the fluidity does not greatly increase above that of the least drastic treatment. Thus the more intense treatments show a greater loss of material, which is undesirable, without a corresponding increase in fluidity, and are for this reason to be avoided. Nevertheless it is apparent that alcoholysis to a high fluidity involves considerably less loss of material than does hydrolysis.

The molecular size of native and mercerized cellulose after alcoholysis to the so-called "limiting fluidity value" was estimated by viscometric methods. The weight average degree of polymerization, calculated from the intrinsic viscosity by the method of Kraemer (Kraemer, E. O., and J. B. Nichols. The Ultracentrifuge by the Svedberg and K. O. Pedersen. Oxford. 1940. p. 420.) yielded values of 132 and 73 glucose units, respectively. The data for obtaining the intrinsic viscosities are given in Table IV.

Methoxyl analysis of cellulose and alcoholyzed cellulose made by a standard method (A. O. A. C. Official and tentative methods of analysis XLI. 5th ed. p. 647–8 (1940)) show that methanolysis introduces a small amount of bound methoxyl. (Attempts to remove this methoxyl by long-continued washing or refluxing with water were unsuccessful.) Although even purified cotton linters gives a small "apparent" methoxyl value, due possibly to hexyl iodide formed by the action of hydriodic acid upon the glucose liberated during the determination, methanolyzed native and mercerized celluloses gave measurably higher methoxyl values. Accordingly, the analyses of methanolyzed cellulose given in Table V should be corrected by subtracting the 0.32 percent "apparent methoxyl" content of the purified cellulose. When this is done there remain 0.22 and 0.52 percent methoxyl, respectively, corresponding to number average degrees of polymerization of 87 and 37 glucose units for the native and mercerized celluloses, respectively. The difference between the weight average degree of polymerization determined by analysis is not surprising. Rather it lies in the direction, and is of the order of magnitude, to be expected of a non-homogeneous mixture of molecular sizes such as is invariably encountered in cellulose and modified cellulose preparations.

Table IV

| Native [1] | | | Mercerized [1] | | |
|---|---|---|---|---|---|
| Conc'n [2] | $\eta r$ | $\eta sp/c$ | conc'n [2] | $\eta r$ | $\eta sp/c$ |
| 0.250 | 1.150 | 0.60 | 0.250 | 1.086 | 0.34 |
| 0.500 | 1.376 | 0.75 | 0.500 | 1.173 | 0.35 |
| 0.750 | 1.559 | 0.74 | 0.750 | 1.301 | 0.40 |
| 1.000 | 1.559 | 0.87 | 1.000 | 1.440 | 0.44 |
| limit sp/c=.51 [3] c→0 D. P._w=.51×260=132 | | | limit sp/c=.28 [3] c→0 D. P._w=.38×260=73 | | |

[1] Low viscosity purified linters, native and mercerized, were treated for 1 hour at 120° with 0.5 N HCl in MeOH.
[2] The cuprammonium hydroxide solution contained 15 g. Cu and 240 g. NH₃ per l.
[3] The limit $\eta sp/c$ was determined by straight line extrapolation c→0 to c=0.

These dispersions were prepared with exclusion of air, but the transfer to Ostwald type viscometer and the measurements were made without exclusion of air. The measurements were made at 25° C.

Table V

| Substance analyzed | Methoxyl found |
|---|---|
| Purified cotton linters | 0.33 |
|  | .34 |
|  | .32 |
|  | .32 |
|  | .34 |
|  | .29 |
|  | .28 |
|  | .32 |
| Average | 0.32 |
| Methanolyzed native cotton cellulose | 0.52 |
|  | .56 |
|  | .55 |
|  | .54 |
| Average | 0.54 |
| Methanolyzed mercerized cotton cellulose | 0.82 |
|  | .85 |
|  | .83 |
|  | .85 |
| Average | 0.84 |

Alcoholyzed cellulose may be used in a variety of ways analogous to the uses of otherwise modified celluloses. It is especially useful in those products which require a relatively small average molecular size for the cellulosic constituent, such as the cellulose nitrates for lacquers and plastics, because in these products large molecular size is associated with unwieldy viscosity characteristics. Also in the production of cellulose xanthate used in the production of rayons and films, it is common practice to age the alkali cellulose until it has become reduced to an optimum molecular size. By employing the alcoholyzed cellulose, described in our examples, in this process it is possible to obtain the desired molecular size rapidly prior to alkali cellulose formation, and furthermore the remarkable resistance of alcoholyzed cellulose against alkaline reagents results in an improved yield and an improved product.

The process has been carried out principally using purified cotton fibers, but it has been found to be equally effective with raw cotton fibers, cotton linters, and with cellulose derived from wood pulp. It is also effective with cellulosic materials which have been pretreated with strong aqueous alkalies.

The process is more specifically exhibited in the following examples:

EXAMPLE I

In this example is exhibited alcoholysis at ordinary temperature with methanol and ethanol. For comparison are included the reaction in the presence of 90 percent methanol and 10 percent water, and the reaction in water—all catalyzed by 0.5 N HCl. Commercial grades of absolute alcohols were used without further purification in this and subsequent examples.

The cotton fiber used in this example had been mechanically cleaned in a Shirley analyzer. It was then extracted in a Soxhlet extractor for four hours with hot alcohol, then boiled for eight hours with water. The fiber was subsequently air-dried and was used in this condition, it having been found in separate experiments that the small amount of moisture introduced with the sample did not cause a detectable change in the course of the reaction. Parallel experiments were set up employing hydrochloric acid in absolute methanol, absolute ethanol, methanol-water (9:1 by volume), and water, each containing HCl in 0.5 N concentration. Samples of cotton fiber were placed in glass-stoppered flasks containing 30 volumes of one of the acid solutions. After having been allowed to stand various lengths of time in a thermostat at 20° C., the samples were removed, filtered on sintered glass filters, rinsed with water until free from acid, and allowed to dry in air. The recovery of fiber was greater than 95 percent in all instances. The results of fluidity measurements on the products from these experiments are shown in Table VI. In column 1 is given the duration of the treatment in hours, in column 2 the fluidity of the methanolyzed samples, in columns 3, 4, and 5 the fluidities of those treated in 90 percent methanol, absolute ethanol, and water, respectively. All fluidities in this table are at 0.5 percent cellulose concentration. The blank spaces indicate that no experiment was run for that particular time and solution.

*Table VI*

| 1<br>Reaction time, hrs. | 2<br>Methanol | 3<br>90% Methanol | 4<br>Ethanol | 5<br>Water |
|---|---|---|---|---|
| 1 | 13.8 | | 11.5 | |
| 2 | | 4.4 | | |
| 5 | 25.1 | 5.9 | 23.1 | 2.8 |
| 25 | 39.7 | 11.2 | 36.7 | 4.5 |
| 50 | 46.0 | | 41.4 | 5.2 |
| 100 | 49.7 | 19.3 | 46.3 | 6.6 |
| 240 | 53.7 | | 52.0 | 10.5 |
| 600 | 56.5 | 35.1 | 53.9 | 16.0 |

Inspection shows that the rate of reaction is greatest in the case of absolute methanol-HCl, slightly less for ethanol-HCl, intermediate for 90 percent methanol-HCl, and least for water-HCl. The fluidity of the original cotton fiber was 2.4 rhes, and since molecular size is inversely related to fluidity it is apparent that the size of the cellulose decreased much more rapidly upon alcoholysis than upon hydrolysis with the aqueous acid.

Figure 2:
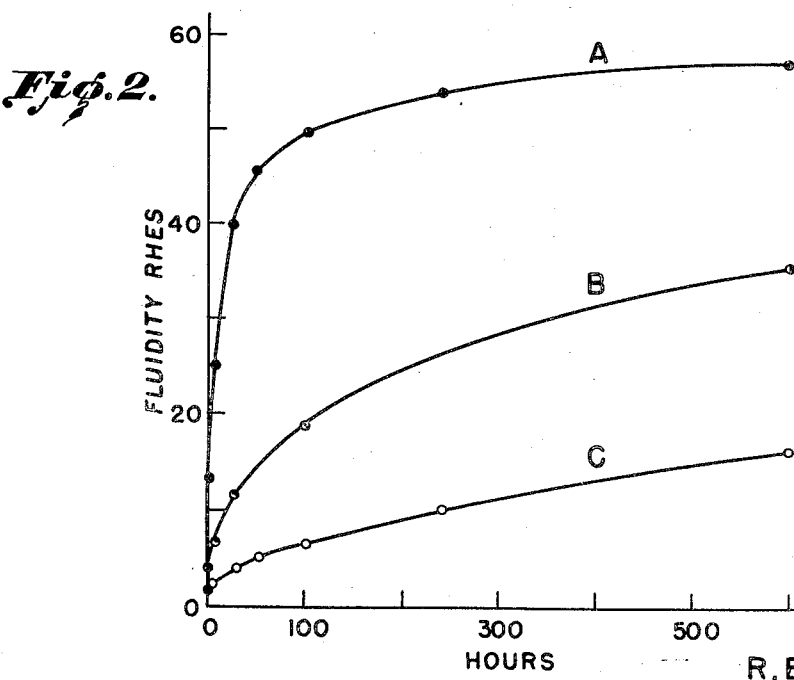

The results of this experiment are also shown graphically in Figure 2, except that the run employing ethanol is omitted since it so closely parallels the one with absolute methanol. In Figure 2 is shown the cuprammonium fluidity of cellulose previously treated at 20° for various lengths of time with 0.5 N HCl in absolute methanol (curve A); with 0.5 N HCl in 90 percent methanol (curve B); and with 0.5 N HCl in water (curve C).

EXAMPLE II

Raw cotton fiber was placed in absolute methanol containing one percent anhydrous HCl, by weight. This suspension was heated under reflux at the boiling temperature and samples of fibers were withdrawn at intervals of 10 minutes and 1 hour. After four hours the refluxing was discontinued and the remaining insoluble material constituted a third treated sample. All the treated samples were rinsed with water until free of acid and then air-dried in the atmosphere for at least 48 hours before cuprammonium fluidity determinations were made. These results are shown in column 3 of Table VII. The value for the 10 minute treatment was obtained using a cellulose concentration of 0.5 percent, while those of the 1- and 4-hour samples employed a 2.0 percent concentration. In column 1 of Table VII is given the time of boiling, and in column 3 is given the copper numbers of the treated samples determined by the method of Heyes.

*Table VII*

| 1<br>Time of refluxing | 2<br>Fluidity | 3<br>Copper No. |
|---|---|---|
| 10 min | 27.9 (0.5%) | 0.28 |
| 1 hr | 12.1 (2%) | .30 |
| 4 hrs | 20.7 (2%) | .22 |

Inspection of Table VII shows that as methanolysis progresses at this elevated temperature, there is no corresponding increase in reducing value as measured by copper number.

*Table VIII*

| 1<br>Reagent | 2<br>Fluidity | 3<br>Copper No. |
|---|---|---|
| Methanol-H₂SO₄ | 33.6 | 0.39 |
| Ethanol-H₂SO₄ | 27.4 | 0.69 |

EXAMPLE III

Cotton fiber, extracted as in Example I and air-dried, was treated in the following manner. Two samples of cotton fiber (3 gm. each) were placed in 250 ml. flasks with (a) about 150 ml. abs. methanol containing sulfuric acids and (b) about 150 ml. of abs. ethanol containing sulfuric acid. (The acid-alcohol reagents were prepared by adding 2.08 ml. concd. sulfuric acid to the particular alcohol and making up to a volume of 200 ml. with the alcohol. Anhydrous sulfuric may also be used.) The flasks containing reagent and fiber were placed in a water bath maintained at 25° C. for 48 hours after which the samples were removed and washed in distilled water until free from all acid reaction. Following air drying cuprammonium fluidity and copper number determinations were made on the samples. The results of these experiments are shown in Table VIII. In column 1 are listed the reagent employed while columns 2 and 3 give fluidity (0.5 percent cellulose concentration) and copper number, respectively.

EXAMPLE IV

Twenty grams of commercially purified low-viscosity cotton linters were placed with 250 ml. of methanol containing one percent HCl in a glass-stoppered bottle. The bottle and contents were placed in a steel autoclave containing the same alcohol and the autoclave was closed tightly. The temperature of the autoclave was raised to 100° C. (about 42 pounds per square inch pressure) and maintained at that temperature for one hour. At the end of this time the autoclave was allowed to cool and the powdery cellulosic product was filtered on a sintered glass filter and washed on the filter with ethyl alcohol until free from acid. The material was finally rinsed with diethyl ether and subsequently dried in a current of air heated to 140° F. The yield was 18.7 grams. The cuprammonium fluidity of the product was 23.0 rhes in 2 percent dispersion.

Sixteen grams of this product when nitrated under standard conditions with a mixture of $HNO_3$—$H_2SO_4$—$H_2O$ gave 22.2 grams of a nitrate containing 11.6 percent nitrogen and exhibiting a nitrate viscosity of 135.5 centipoise when 6.1 grams of the substance were dissolved in a mixture composed of 11 grams of ordinary alcohol, 8.75 grams ethyl acetate, and 24.15 grams of toluene. This product corresponded in appear-

EXAMPLE V

Twenty grams of commercially purified low-viscosity cotton linters were treated for one-half hour at room temperature with about 300 ml. of 18 percent aqueous sodium hydroxide. The fiber was transferred to a filter and washed with water until the washings were neutral. The fiber was then treated for 20 minutes with dilute acetic acid and subsequently washed free of acid with water. After squeezing out most of the water the remaining water was displaced by six successive changes of absolute methanol. The "mercerized" linters were then placed in a glass jar in an autoclave (as in Example IV) with 300 ml. of methanol containing one persent HCl and heated to 120° C. for 1 hour. The acid was removed as in Example IV, however the sample was dried by exposure to the atmosphere for 48 hours. The cuprammonium fluidity of this preparation was 40.2 rhes in 2 percent dispersion. The copper number was 0.18. The yield of material was 18 grams and the product contained 6 percent moisture by weight.

EXAMPLE VI

Thirty grams of commercially purified wood pulp were treated in an autoclave (as in Example IV) with 490 ml. of methanol containing 2 percent HCl for one hour at 120° C. Also 30 grams of the same material was "mercerized" as in Example V and treated exactly as the preceding sample. Both were washed free of acid with alcohol and air-dried. The cuprammonium fluidity (0.5 percent cellulose conc'n.) and the weight loss on the alcoholysis were 24.5 rhes and 2.6 percent, respectively, for the purified wood pulp and 38.9 rhes and 2.8 percent, respectively, for the mercerized wood pulp.

EXAMPLE VII

Anhydrous HCl was led separately into n-propanol, n-butanol, and n-amyl alcohol to give solutions containing 9.44, 9.33, and 10.43 percent HCl, respectively, as determined by direct titration with standard alkali. These stock solutions were diluted with the proper alcohol to form the acid-alcohol solutions used in the following experiments. Ten or twenty gram samples of purified cut cotton fibers were treated in the autoclave (as previously described) at 120° with the solutions and for the duration noted in column 1 of Table IX.

In column 2 is given the percent loss of weight during alcoholysis, in column 3 is given the fluidity (2 percent cellulose concentration), and in column 4 is noted the appearance of the preparation.

*Table IX*

| 1<br>Treatment at 120° C. | 2<br>Loss in weight, percent | 3<br>Fluidity (2%) | 4<br>Appearance |
|---|---|---|---|
| In propanol: | | | |
| 30 min., 0.5% HCl | 6.0 | 17.9 | light brown powder. |
| 30 min., 1.0% HCl | 9.0 | 19.2 | |
| 1 hr., 2.0% HCl | 18.0 | 23.0 | |
| In butanol: | | | |
| 30 min., 0.5% HCl | 2.0 | 17.9 | brown powder. |
| 1 hr., 2.0% HCl | 16.0 | 18.9 | |
| 4 hr., 2.0% HCl | 16.5 | 23.9 | |
| In amyl alcohol: | | | |
| 1 hr., 2% HCl | 19.0 | 22.2 | dark brown. |

The above examples are not to be construed as exhausting the scope of the invention. It is within the purview of the process to employ mixtures of the alcohols, viz., mixtures of two or more of the alcohols, methanol, ethanol, n-propyl, isopropyl, butyl, iso-butyl, amyl, and so forth. Aralkanols such as benzyl alcohol may also be employed.

Other acids may be employed, viz., p-toluene-sulfonic acids may be substituted for hydrochloric and for sulfuric in each of the above examples. A 2-normal acid solution is the preferred upper limit.

The alcoholized cellulose also may be used as a sizing material in textile finishing.

EXAMPLE VIII

Thirty grams of high viscosity cotton linters were treated with one liter of absolute methanol containing 0.5 N anhydrous HCl for 20 hours at approximately 23° C. The fiber was removed on a filter and 915 ml. of the alcoholic acid solution was recovered. The moist fiber was next rinsed free from acid with water and treated on the filter with 300 grams of 18 percent aqueous sodium hydroxide solution. After 10 minutes the alkali was drawn off by suction and the fiber was pressed and sucked as dry as possible. The weight of the alkali cellulose at this point was 105 grams. This was placed in a stoppered bottle with 15 ml. of carbon disulfide and the bottle was rotated on a small mill for 4 hours during which time xanthation took place. Next excess $CS_2$ was removed and 300 ml. of 4.5 percent sodium hydroxide solution was introduced and the milling continued until solution was complete. After a ripening period of 4 days the xanthate solution was filtered through a sintered glass filter and extruded into a suitable acid coagulating bath composed of sulfuric acid, 8 parts; glucose, 10 parts; sodium sulfate, 12 parts; zinc sulfate, 1 part, and water, 69 parts. The filaments, after being washed, stretched, and dried in the usual manner, were of excellent quality. Note that the process involving methanolyzed cellulose entirely omitted the ageing of alkali cellulose now customary in the manufacture of xanthate filaments.

Having thus described my invention, I claim:

1. A process of making alcoholized modified cellulose characterized by improved resistance against attack by hot dilute aqueous alkalies, as compared with hydrocellulose of the same fluidity, and characterized by a copper number less than one, comprising: subjecting substantially dry cellulose to the action of an alcoholic solution containing an acid of the group consisting of sulfuric, hydrochloric, and para-toluene sulfonic acid, said solution containing no more than 2 percent of water, the acid concentration in the alcohol being no greater than 2-normal, the alcohol being a primary alcohol taken from the group consisting of lower primary alkanols and benzyl alcohol, the cellulose being subjected to the simultaneous action of the acid and alcohol, and maintaining them in contact at least until substantially maximum fluidity of the product is attained and until an alcoholized cellulose having a copper number less than one is formed.

2. The process of claim 1 in which the cellulose is cotton, and the acidic alcoholic solution contains no more than one percent of water.

3. The process of claim 1 in which the cellulose is cotton, the alcohol is absolute ethanol, and the acid is HCl in less than one percent concentration.

4. The process of claim 1 in which the cellulose is cotton, the alcohol is absolute methanol, and the acid is HCl in about 0.5 N concentration.

5. The process of claim 1 in which the cellulose is mercerized cotton.

6. The process of claim 1 in which the cellulose is delignified wood.

RICHARD E. REEVES.

REFERENCES CITED

The following references are of record in the file of this patent:

UNITED STATES PATENTS

| Number | Name | Date |
|---|---|---|
| 2,139,302 | De Booys | Dec. 6, 1938 |
| 2,141,669 | Richter et al. | Dec. 27, 1938 |
| 2,368,527 | Edelstein | Jan. 30, 1945 |
| 2,396,957 | Lazier et al. | Mar. 19, 1946 |

OTHER REFERENCES

Wolfram et al., J. A. C. S., vol. 59, page 282, 1937.
Fischer (1), Berichte, vol. 26, page 2400, 1893.
Fischer (2), Berichte, vol. 27, page 673, 1894.
Karrer, "Organic Chemistry," Nordemann Publishing Co., Inc., New York, N. Y., 1938, pages 142–143